Sept. 21, 1965   G. SCHAEFFLER ETAL   3,206,829
METHOD OF PRODUCING SEALED NEEDLE BEARINGS
Filed Aug. 3, 1964   2 Sheets-Sheet 1

INVENTORS
GEORG SCHAEFFLER
RUDOLF JAHN
BY
*Hammond & Littell*
ATTORNEYS

Sept. 21, 1965   G. SCHAEFFLER ETAL   3,206,829
METHOD OF PRODUCING SEALED NEEDLE BEARINGS
Filed Aug. 3, 1964   2 Sheets-Sheet 2

INVENTORS
GEORG SCHAEFFLER
RUDOLF JAHN
BY
Hammond & Littell
ATTORNEYS

United States Patent Office 3,206,829
Patented Sept. 21, 1965

3,206,829
METHOD OF PRODUCING SEALED
NEEDLE BEARINGS
Georg Schaeffler and Rudolf Jahn, Herzogenaurach, near Nurnberg, Germany, assignors to Industriewerk Schaeffler, Herzogenaurach, Germany, a corporation of Germany
Filed Aug. 3, 1964, Ser. No. 387,062
Claims priority, application Germany, Aug. 13, 1963, J 24,239
8 Claims. (Cl. 29—148.4)

The invention relates to a novel method of producing a sealed needle bearing having an external race with a radially-inwardly directed fixed flange on at least one end.

It is known that it is often difficult in actual practice to seal needle bearings since these bearings have a very low radial over-all height and therefore, it is not usually possible to use conventional sealing means in these bearings. However, it is often desirable that needle bearings be provided with their own sealing means whereby it is not necessary to arrange additional sealing members when the bearing is mounted.

It is an object of the invention to provide a novel method of producing sealed needle bearings in a simple, effective manner.

It is another object of the invention to provide sealed needle bearings without special machining operations.

These and other objects and advantages of the invention will become obvious from the following detailed description.

The novel method of the invention for sealing needle bearings comprises placing an elastic sealing disc within the race and against the rim of the race, inserting a metal disc having a frusto-conical or curved form against the sealing disc and applying an axial pressure on the metal disc to wholly or partially flatten the said disc whereby the outer edge of the metal disc bears against the bore of the race and rigidly clamps the sealing disc between the metal disc and the rim of the race.

The resulting sealing arrangement is effective and simple since it requires no special machining of the race to accommodate the seal and therefore it is possible to use the races ordinarily used for non-sealed needle bearings. Another advantage is that the sealing arrangement is space saving since the only additional space required is the axial width of the said sealing disc and the metal disc holding it. The elastic material of which the sealing disc is made may be any suitable material such as rubber, synthetic plastic, etc.

The frusto-conical or curved metal disc used for clamping the sealing disc may be provided in an expedient manner on its outer periphery with a sharp edged projection extending over its entire periphery or a plurality of sharp-edged projections distributed over the periphery so that the disc will dig itself securely into the bore of the race when it is pressed flat. Moreover, the metal disc may also have projections on its surface adjacent the sealing disc which engage in the sealing disc when the metal disc is pressed flat to secure the sealing disc against rotational movement.

The said metal disc may be provided on its outer periphery with a bent-over portion whereby the sealing disc is united to the metal disc to form a single unit. This has the advantage that the two parts needed for the sealing arrangement do not have to be handled separately and assembly is therefore simplified. Since the bending-over of the disc gives the outer periphery of the disc a rounded edge, such a sealing arrangement is particularly advantageously used in outer races shaped without cutting and whose radially-inwardly directed rim is formed-on without cutting. In such races, there is some rounding between the inwardly-directed rim and the raceway due to the manufacturing technique, and a metal disc with a rounded outer periphery fits such a race particularly satisfactorily.

The bore of the metal disc clamping the sealing disc may further be provided with an angled-over portion whereby the bore of the sealing disc will be conical in shape. This shaping of the bore portion of the sealing disc holds the disc constrainedly in a position which prevents the lip of the sealing disc from being reversed when a shaft is inserted into the bearing.

It is also possible to provide a needle bearing sealed at both ends with an outer race of a needle bearing constructed by known means as a sleeve shaped without cutting. In this case the sleeve may be constructed in a known manner at the end remote from the rim with a reduced wall thickness to provide a shoulder in the bore of the sleeve. After forming the first sealing arrangement as described above, a metal disc is inserted into the end of the race with the reduced wall and abutting against the shoulder, an elastic sealing disc is placed against the metal disc and then the end of the sleeve with the reduced thickness is flanged-over by shaping to form a radially-inwardly directed rim which clamps the sealing disc in position between itself and the metal disc. Again, no additional machining operations or considerable amount of space is required.

The metal disc used for the latter sealing operation may originally be flat or frusto-conical in form. If frusto-conical in form, the inclination of the disc must be directed towards the subsequently flanged-over rim so that when the rim is flanged-over, the metal disc is pressed flat and a still better fixing of the sealing means is obtained.

Referring now to the drawings.

Figure 1:
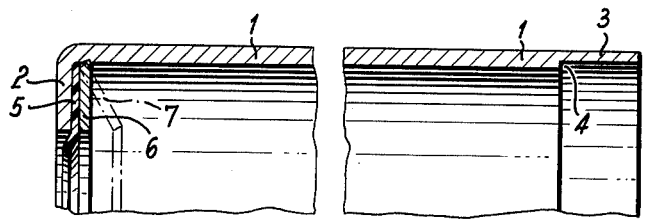
FIG. 1 is a partial longitudinal sectional view of one sealing arrangement of the invention having a radially-inwardly directed rim at one end.

In the embodiment illustrated in FIG. 1, the outer race 1 is drawn from sheet metal and at one end has a radially-inwardly directed rim 2 which is formed without cutting. The wall thickness of the other end 3 of the race 1 is reduced to form a shoulder 4 in the bore of the race. A sealing disc 5 made of elastic material is placed against the rim 2 of the race and is clamped in position by a metal disc 6. The metal disc 6 originally had the shape indicated by the dot-dash lines at 7 and when axial pressure was applied, the metal disc was pressed flat so that it bears against the bore of the race or even engages therein to a slight distance with sharp edged projections and thereby clamps the sealing disc 5 between itself and rim 2.

Figure 2:
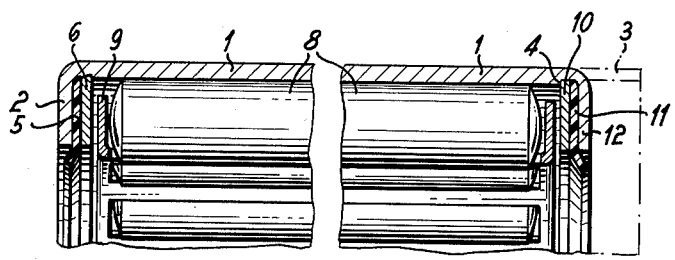
FIG. 2 is a partial longitudinal sectional view of another sealing arrangement of the invention having both ends sealed.

As in FIG. 1, FIG. 2 also shows an outer race for a needle bearing which is produced without cutting and a sealing arrangement on the left arranged as described above. FIG. 2 also shows the rollers 8 which are held and guided in an axially-parallel manner by a cage 9 which is known to those skilled in the art. In contrast to FIG. 1, the right hand side of the outer race is also provided with a sealing arrangement. A metal disc 10 is introduced into the reduced end 3 (indicated by dot-dash lines) of the race 1 and bears against the shoulder 4 of the bore. A sealing disc 11 is then placed against the metal disc 10 and the reduced end 3 is flanged over to form radially-inwardly directed rim 12 which rigidly clamps sealing disc 11 between the metal disc 10 and the rim 12.

Figure 3:
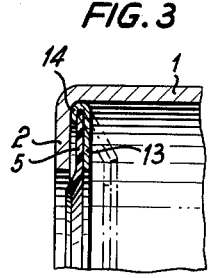
FIGS. 3 to 7 are partial longitudinal sectional views of other modifications of the sealing arrangement illustrated in FIG. 1.

In the embodiment illustrated in FIG. 3, the sealing disc 5 is held to a metal disc 13 by an outer bent-over portion 14 which with its rounded transition region matches the rounding formed between the race 1 and the inwardly-directed rim 2 by the manufacturing technique. The original shape of the metal disc 13 and sealing disc 5 is shown by the dot-dash lines in FIG. 3.

Figure 4:
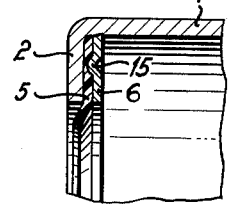

FIG. 4 illustrates a method of sealing similar to FIG. 1 wherein the sealing disc 5 is placed against the inside of rim 2 and is then rigidly clamped by the metal disc 6 which was originally frusto-conical or arched in form before being pressed flat. In contrast to FIG. 1 however, the metal disc 6 has indentations 15 at several places on its periphery which engage in the sealing disc 5 to prevent it from rotating. The rotation of sealing disc 5 can be prevented by vulcanizing, gluing or the like sealing disc 5 to metal disc 6 instead of using indentations 15.

Figure 5:
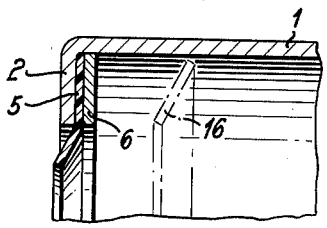
Figure 6:
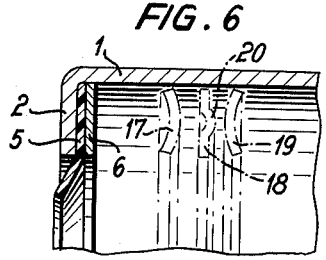

The embodiment of FIG. 5 does not differ in its final state from FIG. 1 but the dot-dash line 16 shows that the metal disc 6 may be frusto-conical but inclined in the opposite direction. The metal disc can be flattened by axial pressure to achieve satisfactory clamping. Again, the embodiment illustrated in FIG. 6 does not differ in final shape but shows different forms that metal disc 6 may have before being flattened by axial pressure. In the case of example 17 and 19, the disc is originally arched over its entire height with the curvature simply being in opposite direction in the two cases. The outer diameters of these discs are constructed so that they can just be fitted axially with slight clearance into the race 1 and when the discs 17 and 19 are pressed flat by axial pressure, their outer diameters increase so that they bear firmly against the bore of the race 1. The same applies to disc 18 which instead of a curvature over its entire height has a single encircling undulation 20.

Figure 7:
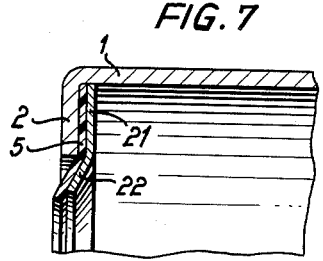

The embodiment of FIG. 7 differs from the above-described embodiments in that the bore of a metal disc 21 which applies pressure on sealing disc 5 has an angled-over portion 22 which deforms the sealing disc 5 to a conical shape at its bore portion. It is also possible of course to insert further components such as discs or the like, i.e. between the sealing disc and the rim on one hand and the sealing disc and the metal disc clamping it on the other hand.

Various modifications of the method of the invention may be made without departing from the spirit or scope thereof and it is to be understood that the invention is to be limited only as described in the appended claims.

We claim:

1. A method of producing a sealed needle bearing having an outer race which has a radially-inwardly directed rim on at least one end which comprises placing an elastic sealing disc within the outer race and against the inwardly-directed rim of the race, inserting a metal disc having a arched or frusto-conical form against the sealing disc and applying an axial pressure on the metal disc to straighten it at least partially whereby the outer edge of the metal disc bears against the bore of the race and firmly clamps the sealing disc between the metal disc and the rim of the race.

2. The method of claim 1 wherein the outer periphery of the metal disc is provided with a sharp-edged projection extending over the entire periphery.

3. The method of claim 1 wherein the outer periphery of the metal disc is provided with a plurality of sharp-edged projections distributed over the periphery.

4. The method of claim 1 wherein the metal disc is provided with projections on its face adjacent to the sealing disc which engage the sealing disc upon application of the axial pressure.

5. The method of claim 1 wherein the metal disc has on its outer periphery a bent-over portion whereby the sealing disc is united to the metal disc to form a single unit.

6. The method of claim 1 wherein the metal disc is provided in its bore with an angled-over portion which deforms the bore portion of the sealing disc to a conical shape.

7. A method of producing a needle bearing sealed at both ends in which the race is constructed from a sleeve shaped without cutting and having a radially-inwardly directed rim at one end and a reduced wall thickness at the other end to form a shoulder in the bore of the sleeve which comprises inserting an elastic sealing disc within the said sleeve and abuting against the radially-inwardly directed rim, inserting a metal disc having a frusto-conical or arched form against the sealing disc, applying axial pressure on the metal disc to straighten it at least partially whereby the outer edge of the metal disc bears against the bore of the race and firmly clamps the sealing disc between the metal disc and the rim of the race, inserting the needle rollers into the race, inserting a second metal ring into the sleeve and abuting against the shoulder of the end with the reduced thickness, inserting a second elastic sealing disc against the said second metal disc and flanging-over the reduced end of the sleeve to form a radially-inwardly directed rim whereby the sealing disc is clamped between the said rim and the metal disc.

8. The method of claim 7 wherein the second metal disc is arched in the direction towards the subsequently formed rim.

References Cited by the Examiner
UNITED STATES PATENTS

| | | | |
|---|---|---|---|
| 1,630,339 | 5/37 | Ganster | 29—148.4 X |
| 2,879,114 | 3/59 | Bowen | 308—187.2 |

WHITMORE A. WILTZ, *Primary Examiner.*